E. KATZINGER.
APPARATUS FOR FORMING WELDING PROTUBERANCES ON SHEET METAL AND THE LIKE.
APPLICATION FILED OCT. 19, 1910.
1,064,339.
Patented June 10, 1913.
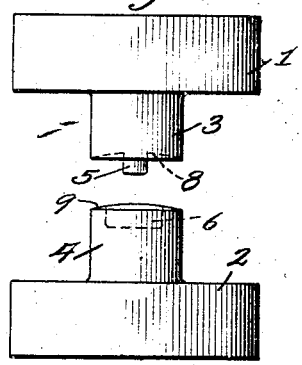
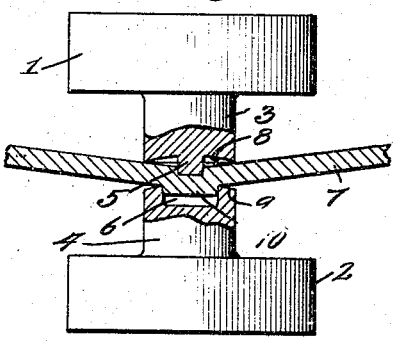
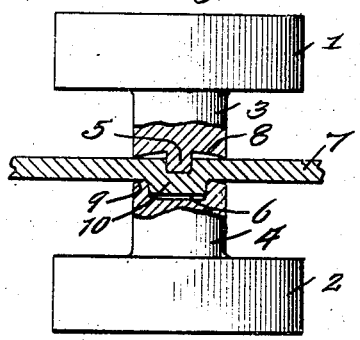
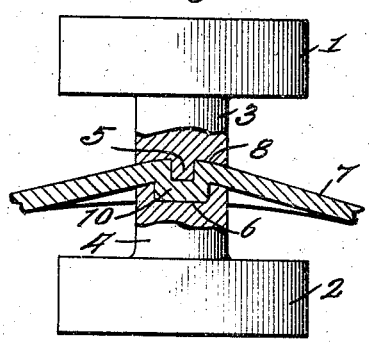
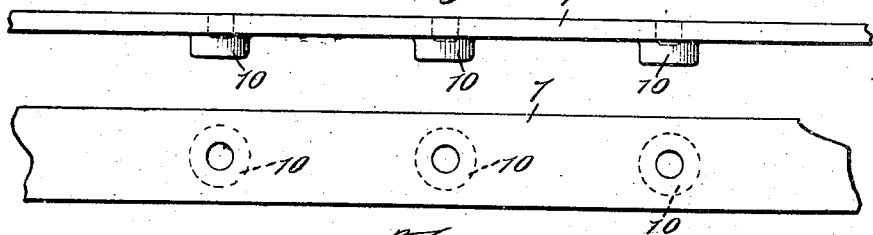
Witnesses:
Inventor:
Edward Katzinger
By Brown & Hopkins
Attys

UNITED STATES PATENT OFFICE.

EDWARD KATZINGER, OF CHICAGO, ILLINOIS.

APPARATUS FOR FORMING WELDING-PROTUBERANCES ON SHEET METAL AND THE LIKE.

1,064,339.

Specification of Letters Patent.

Patented June 10, 1913.

Original application filed May 9, 1910, Serial No. 560,102. Divided and this application filed October 19, 1910. Serial No. 587,812.

*To all whom it may concern:*

Be it known that I, EDWARD KATZINGER, a citizen of the United States, residing at Chicago, in the county of Cook and State of Illinois, have invented certain new and useful Improvements in Apparatus for Forming Welding-Protuberances on Sheet Metal and the Like, of which the following is a specification.

This application is a division of my original application, Serial No. 560,102, filed in the United States Patent Office May 9, 1910, and the present invention relates to an improved apparatus or mechanism for preparing metals for being united by spot welding, and it has for its primary object to provide an improved apparatus whereby a strip or piece of sheet metal may be stamped to provide welding protuberances thereon and when so stamped, the strip or sheet will be by said apparatus left in a perfectly flat condition.

Another object of the invention is to provide an improved apparatus whereby the strip or sheet metal may be so stamped, while at the same time the scale usually found on metal which has been introduced into a pickling bath will be removed.

Other and further objects will appear in the specification and be more specifically pointed out in the appended claims, reference being had to the accompanying drawings which illustrate the strip or sheet metal in the different stages of its formation.

In the drawings, Figure 1 is a view in elevation of coöperating dies by means of which a strip or sheet metal is provided with welding protuberances. Fig. 2 is a similar view, illustrating the first stage of the process in preparing the strip of metal for spot welding, parts being shown in section. Fig. 3 is a view similar to Fig. 2 illustrating a further stage of the formation of the strip or sheet of metal. Fig. 4 is a view similar to Figs. 2 and 3 showing the dies at the end of the stamping operation. Fig. 5 is a side elevation of the strip provided with a plurality of welding protuberances in the manner indicated in Figs. 2, 3 and 4. Fig. 6 is a top plan view of the strip shown in Fig. 5.

According to the present well known method of spot welding, one of the sheets may be provided with one or more protuberances which are pressed against the other sheet while a welding current is being passed therethrough. These protuberances can be most easily and rapidly formed between stamping dies but according to the present well known methods the strip or sheet is bowed radially in all directions around each protuberance so that the sheet has imparted thereto a plurality of cup shaped hollows. Moreover, when the strip or bar is thus stamped, the bends in said bar corresponding to the location of said hollows cause the bar to assume an arcuate form. In consequence of these drawbacks, it becomes necessary to hammer the sheet or strap out flat before the welding takes place, an operation which consumes considerable time and effort. To provide stamping dies of improved construction and conformation whereby the hand straightening or flattening operation is rendered unnecessary, constitutes the primary object of this invention. By means of the construction and arrangements of parts in the present device, however, a further beneficial result accrues in that the oxid scales which are usually found on the metals to be welded are removed during the stamping operation thus rendering unnecessary the usual pickling bath with its attendant expense and inconvenience.

In pursuance of the objects and purposes of the present invention, means are provided for cupping the metal oppositely to the cupping which occurs during the formation of the protuberance. For this purpose, stamping dies 1 and 2 are made use of, the contiguously disposed ends of the shank portions 3 and 4 of which are provided respectively with a protuberance 5 and recess 6 so proportioned and arranged as to form a protuberance 10 on the metal to be stamped, when the dies are moved together. In Fig. 2, is shown the form assumed by the strap or bar 7 during the first stage of the operation in which the protuberance 10 is approximately completely formed and the bar on either side deflected upwardly into a position corresponding to that assumed by a bar after it has been operated upon by present well known types of stamping dies.

The distinguishing feature of the device forming the subject matter of the present invention resides in and is connected with the provision at the end of the male die of a cupped hollow 8 having a curvature corresponding to the convex end 9 of the female die.

In Fig. 3, is shown the relative positions of dies 1 and 2 corresponding to the final positions of dies commonly used. Should the bar 7 be removed at this stage of the operation, it would assume a position approximately that shown in Fig. 2. The stamping operation being continued, however, until the parts assume the positions shown in Fig. 4, the bar 7 upon being removed from between the dies 1 and 2, assumes the straight flat position shown in Fig. 5, inasmuch as the degree of curvature imparted to the end faces of the dies 1 and 2 is just sufficient to overcome the cupping which takes place during the first part of the process. In Fig. 5 is indicated the final position assumed by the bar 7 after it has been provided with a plurality of protuberances 10. As the process is carried out and the bar 7 passes by successive stages from the position shown in Fig. 2 to that shown in Fig. 4, a complete rearrangement of the surface molecules takes place with the result that the scales usually found on the surface of the bar, are entirely removed thus insuring a clean welding surface.

What I claim is—

1. The combination with a die provided with a recess and a convex end face extending around said recess, of a second die provided with a projection adapted to coöperate with the recess in the first said die to stamp a welding protuberance in a piece of sheet metal, said second die being further provided with a cupped end face extending around said projection, the end faces of said dies being adapted to coöperate to flatten the metal of said sheet around each protuberance after it has been bent out of shape by the first part of the stamping operation.

2. The combination of coöperating dies, one having a projection with an annular beveled recess at the bottom, and the other having a depression with an edge concaved to correspond with the said recess, the said dies being effective to cup a metal in opposite directions by a single stamping operation and to bend the metal whereby it will assume a flat position when released from the pressure of the dies.

3. In an apparatus of the class described, the combination of a die formed with a projection surrounded by a concavely arched recess inclined toward the base of the projection, and a coöperating die having a depression larger than said projection and with an annular rim convexly arched to correspond with the said concavely arched recess of the other die whereby a piece of metal is bent first in one direction and then in the other direction by the said arched portions during the formation of a welding protuberance whereby the piece, when released by the dies, will be in a flat condition.

In testimony whereof I have signed my name to this specification, in the presence of two subscribing witnesses, on this 17th day of October, A. D. 1910.

EDWARD KATZINGER.

Witnesses:
C. H. SEEM,
FRANCIS A. HOPKINS.